Oct. 4, 1949.
P. N. SITTON
2,483,564
SEPTIC TANK
Filed May 26, 1948
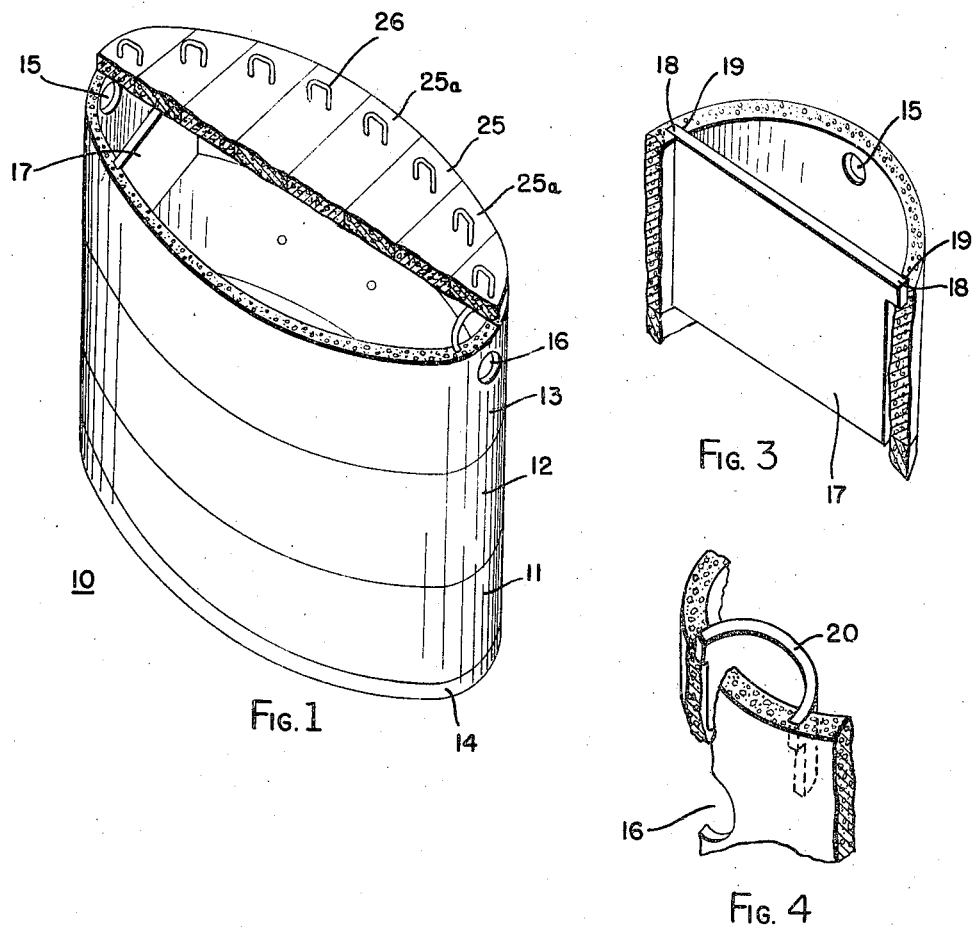
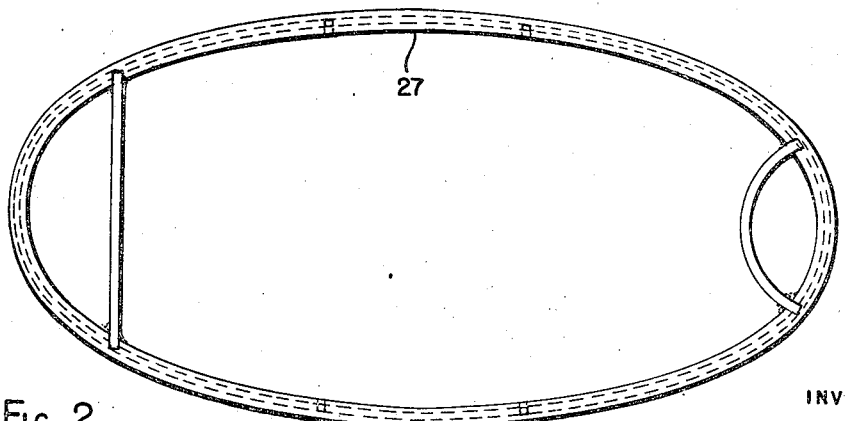
INVENTOR
PHILIP N. SITTON
By Toulmin & Toulmin
ATTORNEYS Patented Oct. 4, 1949

2,483,564

UNITED STATES PATENT OFFICE 2,483,564

SEPTIC TANK

Philip N. Sitton, Dayton, Ohio

Application May 26, 1948, Serial No. 29,261

1 Claim. (Cl. 210—6)

This invention relates to septic tanks, and particularly to a specific improved form of a septic tank by which an improved action is obtained in the tank and the life of the tank is increased. By life of the tank is meant the time between cleanings, these being required periodically.

The usual type of septic tank is either round, square, or rectangular. Tanks of this nature have have not been satisfactory for the reason that no thought has been given to the retention period and to sludge formation in the tank. To provide for an efficient septic tank it is essential that the retention period shall not be less than twenty-four hours. Also, to have a tank having any length of useful life, it is essential that sludge formation shall be uniform over the bottom of the tank, eliminate piling up in the tank which reduces the retention period in the tank.

An object of this invention is to provide a septic tank which will have a satisfactory retention period, and in which sludge formation will be uniform over the bottom of the tank.

To accomplish the foregoing objects, it is a further object of the invention to provide a septic tank that is substantially elliptical in transverse cross-section and in which the inner walls of the tank are in the form of a continuous arc from the ends of the tank toward the middle thereof.

It is still another object of the invention to provide a septic tank that is fully portable and will have great strength against crushing by ground pressure when installed in the ground.

Further objects and advantages will become apparent from the drawings and the following description.

In the drawings:

Figure 1 is a perspective elevational view, partially in cross-section, of a concrete septic tank constructed in accordance with this invention;

Figure 2 is a plan view of the septic tank illustrated in Figure 1 but with the top cover removed;

Figure 3 is a perspective view of a portion of the septic tank illustrating the inlet baffle arrangement that is placed within the tank;

Figure 4 is a perspective view of a portion of the septic tank illustrating the arrangement of the outlet baffle in the tank.

In this invention the septic tank 10 consists of three principal sections 11, 12 and 13 which are cast of concrete. Each section 11, 12 and 13 has the same general contour of the vertical side wall section thereof, which is illustrated in Figure 2. The general form of the tank, particularly the inner wall thereof, is in the nature of an ellipse, as shown in Figure 2.

The tank 10 has a bottom or base slab 14 upon which the lower section 11 is placed. The two side wall sections 12 and 13 are then placed upon the section 11 to provide a tank of sufficient depth to give the desired capacity.

The section 13 is provided with an inlet opening 15 at one end thereof and an outlet opening 16 at the opposite end thereof. It will be noted that the inlet and outlet openings are in substantially the end extremity of the elliptical form of the septic tank, thus placing the inlet and outlet at the points of greatest separation.

A baffle 17 is provided adjacent the inlet opening 15 to force the effluent to pass downwardly into the tank. This baffle 17 is provided with ears 18 at opposite sides thereof which are inserted in suitable slots 19 in the side wall of the section 13 to support baffle 17 in its position adjacent the inlet opening 15.

A baffle 20 is positioned adjacent the outlet opening 16 and may be supported by the side walls of the section 13 in the same manner as the inlet baffle 17.

It will be noted that the inlet baffle 17 provides, with the side wall of the septic tank, a gradually increasing chamber from the inlet opening 15 toward the interior of the tank. This arrangement provides for gradual spread of the effluent uniformly throughout the tank.

A top cover 25 is provided for the septic tank and may consist of a plurality of sections 25a each of which is provided with an iron loop 26 for raising the lid off the tank.

The inner wall 27 of the septic tank is in the form of a continuous curve from one end of the tank toward the middle portion thereof to provide a smooth-flowing wall portion. The arc of curvature of the inner wall 27 of the septic tank continuously decreases from the ends of the tank toward the center portion thereof with the center portion of the tank being provided with the minimum arc of curvature and the end portions of the tank with the maximum arc of curvature. Thus, the inner wall 27 of the tank is in the form of an ellipse.

It was discovered after much inspection of hundreds of tanks, that the flow pattern of the effluent through the tank is in the form of an ellipse regardless of the shape of the tank. Also, that to provide for a desired retention period of approximately twenty-four hours within the tank, it was necessary to have the tank at least twice as long as wide. Such an arrangement could be provided in a rectangular tank, but sludge would tend to pile up at the inlet end of this kind of a tank for the reason that the flow pattern of the effluent could not form naturally within the tank. The disturbance to the flow pattern prevents uniform distribution of sludge over the bottom of the tank, thus greatly reducing the life of the tank and also reducing the retention period of the matter within the tank.

The smooth elliptical form of septic tank provides maximum efficiency for the flow pattern of the effluent can be formed naturally and will be continuously maintained without any disturbance. Since the elliptical form of the inner wall 21 of the septic tank allows the effluent to flow in its natural flow pattern through the tank from the inlet to the outlet thereof, uniform distribution of sludge is obtained over the bottom of the tank. This uniform distribution is also aided by the fact that the elliptical form of the tank causes the effluent at the inlet end to move at a slightly greater rate than when it approaches the center portion of the tank. Thus, sludge is carried away from the inlet end of the tank and the usual piling up of sludge is avoided at the inlet end of the tank.

The elliptical form of the septic tank has also been found to be most adapted for installation of concrete tanks underground for maximum strength is given to the tank to prevent collapse against ground pressure.

When a septic tank is installed underground, the ground applies considerable pressure upon the walls of the septic tank. This pressure shifts from time to time due to varying conditions of the ground, such as the water content of the ground or freezing and thawing conditions. Since all portions of the elliptical tank are in the form of an arc, maximum strength is given to the wall section.

Thus, it has been found that the wall section of the tank can be greatly reduced from that of conventional concrete septic tanks to such an extent that only about 50% of the thickness of wall is required, compared to that normally recommended for underground storage tanks. As for example, the wall of the septic tank of this invention is approximately 2" whereas recommendations for underground storage tanks specify wall thickness of from 4" to 5". Thus, the form of the septic tank aids greatly in portability of the device for installation in the ground.

Having thus fully described my invention, what I claim as new and desire to secure by Letters Patent is:

A septic tank consisting of, a bottom wall, vertically arranged side wall means forming a hollow body providing an unobstructed elliptical chamber of the same size from top to bottom thereof having an internal length substantially twice that of the internal width thereof with the maximum width of the chamber being midway between opposite ends of the chamber, an inlet and an outlet in said side wall means adjacent the upper edge thereof and positioned in the end extremities of the said chamber, said chamber having the inner wall thereof forming an ellipse at all transverse cross-sections of the chamber from top to bottom thereof against which said inner wall fluids move in a continuously expanding flow across said chamber from said inlet end thereof to the median portion of said chamber and in a continuously contracting flow from the said median portion of said chamber to said outlet end thereof, said inner wall at both sides of the chamber having a continuous arc of curvature that continuously decreases from each end of the chamber toward the center portion thereof with the center portions of the inner walls forming the minimum arcuate portions and the end portions forming the maximum arcuate portions, and baffle means extending across said elliptical chamber into engagement with said arcuate walls thereof at each end of the chamber adjacent the inlet and outlet and extending from a position above the respective levels of said inlet and outlet openings to a position below the respective levels of said inlet and outlet openings.

PHILIP N. SITTON.

REFERENCES CITED

The following references are of record in the file of this patent:

UNITED STATES PATENTS

| Number | Name | Date |
| --- | --- | --- |
| 1,557,523 | Hahn | Oct. 3, 1925 |
| 1,634,871 | Hepler | July 5, 1927 |
| 1,695,781 | Otis | Dec. 18, 1928 |
| 1,877,507 | Hendricks | Sept. 13, 1932 |
| 2,378,616 | Burgett | June 19, 1945 |
| 2,440,762 | Sitton | May 4, 1948 |

FOREIGN PATENTS

| Number | Country | Date |
| --- | --- | --- |
| 645,510 | France | June 27, 1928 |
| 306,192 | Germany | June 22, 1918 |